United States Patent [19]

Armbruster

[11] 3,853,706

[45] Dec. 10, 1974

[54] PROCESS FOR PRODUCING NON-WAXY STARCH HYDROLYSATES

[75] Inventor: Frederick Carl Armbruster, Lagrange, Ill.

[73] Assignee: CPC International Inc., Englewood Cliffs, N.J.

[22] Filed: Jan. 18, 1971

[21] Appl. No.: 107,436

Related U.S. Application Data

[63] Continuation-in-part of Ser. No. 626,952, March 30, 1967, abandoned.

[52] U.S. Cl. .................................................. 195/31 R
[51] Int. Cl. .................................................. C12b 1/00
[58] Field of Search .................................. 195/31, 17

[56] References Cited

UNITED STATES PATENTS

| | | | |
|---|---|---|---|
| 3,280,006 | 10/1966 | Hurst et al. | 195/31 |
| 3,371,018 | 2/1968 | Ewing et al. | 195/31 |
| 3,423,239 | 1/1969 | Goos | 195/31 X |
| 3,560,343 | 2/1971 | Armbruster et al. | 195/31 |

OTHER PUBLICATIONS

Wallerstein Co. Data Sheet No. 242, Jan. 1965.

Wallerstein Co. Technical Bulletin No. 236, Apr. 1964.

Wallerstein Data Sheet No. 242, published Jan. 1965, by the Wallerstein Co.

Wallerstein Technical Bulletin No. 236, published Apr. 1964, by the Wallerstein Co.

*Primary Examiner*—Lionel M. Shapiro
*Attorney, Agent, or Firm*—Albert P. Halluin

[57] ABSTRACT

The present invention provides a process for preparing low D.E. starch hydrolysates and low D.E. conversion syrup products which are both liquid and solid. Starch is treated with bacterial alpha amylase to a D.E. less than 15. The hydrolytic action of the amylase is terminated by heat treatment and the resulting hydrolysate is further converted with bacterial alpha amylase to a D.E. between about 5 and about 20. From the resulting hydrolysate product is obtained a non-hazing syrup which is substantially completely water soluble.

17 Claims, No Drawings

PROCESS FOR PRODUCING NON-WAXY STARCH HYDROLYSATES

This application is a continuation-in-part application of U.S. Ser. No. 626,952, filed Mar. 30, 1967, now abandoned.

The present invention relates to a process for preparing low D.E. starch hydrolysates and low D.E. starch conversion syrups. The present invention also relates to the resulting products. D.E. is an abbreviation for dextrose equivalent, which is a common expression in the art for describing the total reducing sugars content of a material calculated as dextrose and expressed as percent, dry basis.

Conventionally, low D.E. starch conversion syrups and syrup solids have been produced by the hydrolysis of starch with acids. The primary emphasis in the preparation of commercial starch hydrolysate syrups has been on attaining stability, clarity and non-crystallizing characteristics.

There is a large potential market for syrups and syrup solids with bland taste, low sweetness and low hygroscopicity at a low D.E. level. Such hydrolysates and syrup solids are useful as bases for the preparation of food items as well as for bodying agents and as additives having non-sweet, water-holding, non-hygroscopic characteristics. Other applications include use as a carrier for synthetic sweeteners, as a flavor enhancer, as an additive for coloring agents, as a spray drying adjunct for coffee extracts or tea extracts, as a bulking, bodying, or dispersing agent in synthetic creams or coffee whiteners, as a moisture holding agent in breads, pastries, meats, and as a bodying and smoothing agent in puddings, soups, and frozen desserts. Low D.E. syrups having a D.E. less than 28 to 30 are not practical to produce from ordinary starches by the processes of the prior art. Previous attempts to produce low D.E. syrups from ordinary starches failed by way of extremely poor filtration rates, yield losses and substantial insolubility of syrup solids.

One object of the present invention is to provide a novel low D.E. starch hydrolysate product.

Another object of the present invention is to provide a low D.E. syrup that is clear and stable.

A further object of the present invention is to provide a bland-tasting, low sweetness, non-hygroscopic low D.E. starch hydrolysate product.

Still another object of the present invention is to provide a syrup solids product with improved characteristics with respect to hygroscopicity and water solubility.

Another object of the present invention is to provide syrups and syrup solids for use in food products, the syrup products having a minimum effect on flavors while simultaneously providing bulk and/or stability to the food product.

A related object of the invention is to provide new practical processes for the manufacture of syrups and syrup solids in starch hydrolysate products of the character described.

A similar object of the invention is to provide new practical processes for the manufacture of low D.E. starch hydrolysates that may be clarified and remain clear at high solids concentration.

Other objects of the present invention will be apparent hereinafter from the following description and from the recitals of the appended claims.

The present invention provides a process for preparing a novel low D.E. starch hydrolysate. This process comprises subjecting a mixture of starch and water having a solids content less than about 50 percent to the hydrolytic action of bacterial alpha amylase to obtain a starch hydrolysate having a D.E. between about 2 and about 15, subjecting the starch hydrolysate to heat treatment to substantially inactivate the enzyme, i.e., to a temperature greater than about 95°C, cooling the starch hydrolysate to a temperature less than about 95°C, and subjecting the hydrolysate to further hydrolytic action of bacterial alpha amylase to obtain a starch hydrolysate having a D.E. between about 5 and about 20. The resulting product is also characterized by having the sum of the percentages of saccharides therein, dry basis, having a degree of polymerization of 1 to 6 divided by the D.E. provide a ratio of at least about 2.0. This ratio is referred to hereinafter as the characteristic or descriptive ratio.

The present invention also provides a process for preparing a novel low D.E. syrup by the concentration of a starch hydrolysate produced in accordance with this invention to yield a syrup having a solids content greater than 50 percent. The hydrolysate may be refined by conventional means.

The present invention also provides a process for preparing syrup solids by reducing the moisture content of either a starch hydrolysate or a syrup produced in accordance with this invention to a moisture content of less than 15 percent.

It has been discovered that syrups and starch hydrolysate products may be obtained from starch by a two step application of the hydrolytic enzyme to the starch to yield a starch hydrolysate having a D.E. between about 5 and about 20, and having a descriptive ratio of at least about 2.0.

One preferred method of practicing the present invention involves the steps of:

1. slurrying corn starch in water to a solids concentration of between about 10 percent and about 50 percent,
2. solubilizing the starch by gelatinization,
3. subjecting the mixture to treatment with bacterial alpha amylase to hydrolyze the starch to a D.E. between about 2 and about 15,
4. heating the starch hydrolysate to a temperature greater than about 95°C, preferably between about 110°C and 150°C, to terminate the hydrolytic action of the enzyme,
5. cooling the starch hydrolysate to a temperature less than 95°C,
6. subjecting the hydrolysate to further treatment with bacterial alpha amylase to hydrolyze the starch to a D.E. between about 5 and about 20, and
7. recovering a starch hydrolysate product characterized by high water solubility and a descriptive ratio of at least about 2.0.

The resulting hydrolysate may be concentrated and/or refined by conventional procedures to yield a stable corn syrup which is substantially haze-free and highly soluble in water. The syrup may be spray dried to yield corn syrup solids with low hygroscopicity and high water solubility.

Suitable starches include ceral starches such as corn, grain sorghum and wheat.

The initial step, i.e. solubilization of the starch, may be accomplished, for example, by heating a starch-water slurry above the gelatinization temperature of the starch or by adding dry starch to heated water or by other similar means. The enzyme preparation may be added to the starch before, during or after the starch is gelatinized. However, if the enzyme preparation is added prior to solubilization of the starch, it is preferred that the solubilization of the starch be carried out at a temperature less than 95°C, so as not to inactivate the enzyme.

The preferred enzyme used for the conversion of starch to low D.E. syrups in accordance with the invention is the type commonly referred to in the art as bacterial alpha amylase. It is a starch liquefying, heat resistant hydrolytic alpha amylase. Suitable bacterial alpha amylases may be produced by certain strains of *Bacillus subtilus*, *Bacillus mesentericus* and the like by conventional fermentation methods. HT–1000, a proprietary bacterial alpha amylase preparation produced and marketed by Miles Chemical Laboratories, is an example of an enzyme preparation that is suitable for use in the present invention. Other suitable bacterial alpha amylases include Rhozyme H–39, manufactured and sold By Rohm and Haas, and CPR–8 manufactured and sold by the Wallerstein Division of Baxter Laboratories, Inc.

The pH of the conversion medium is preferably that which is suitable for the optimum activity of the bacterial alpha amylase. Generally, this pH range is between about 6.0 and about 8.0. The most suitable temperature range lies between that required for gelatinized starch, which is at least about 60°C, and that at which the enzyme will lose a large portion of its activity, which is about 95°C. It has been found that the preferred temperature range is between about 70°C and about 95°C.

The quantity of bacterial alpha amylase preparation required for obtaining the desired starch hydrolysate will be dependent upon the activity of the bacterial alpha amylase preparation, the conversion temperature of the conversion medium, the D.E. after the initial hydrolysis, the pH of the medium, and the desired terminal D.E. Suitable conditions are easily selected. For example, a bacterial alpha amylase preparation having an activity substantially equivalent to the HT–1,000 product of Miles Chemical Laboratories would be used in an amount between about 0.025 percent and about 0.1 percent by weight of the starch on the dry basis. The conversion conditions would include a temperature of about 80°C and a pH of about 7 for a period of time sufficient to attain the desired D.E.

When the desired D.E. is reached in the first hydrolysis step, conversion action is stopped by raising the temperature to at least 110°C. The temperature preferably is raised to from about 110°C to about 180°C, and preferably from about 120°C to about 150°C. Although the enzyme is inactivated during the heat treatment, some advantages are realized. These include improved filtration rates, and decreased yield losses upon filtration.

After the second hydrolysis step, conversion action may be stopped by adjusting the pH to 4.5 or below, or by heating the conversion mixture to a temperature above the inactivation temperature of the enzyme, or by operating at conditions which result in an inactivation of the enzyme when the desired terminal D.E. is attained.

It is desirable to operate at a relatively high dry substance level up to about 50 percent and preferably in the range from about 20% to about 40 percent, i.e., from about 10° to about 20° Baume. When operating at a high dry substance level, the required tank volume for conversion is reduced as are evaporation costs. However, the process is suitably operable at dry substance concentrations outside of this range.

The liquefying and saccharifying conditions may be varied within certain limits dictated by the stability and activity characteristics of the enzyme and the gelatinization properties of the starch.

After termination of the second enzyme conversion, the resulting starch hydrolysate has a solids content less than 50 percent. It may be used in unaltered or refined form as a desirable product for the uses suggested heretofore. In addition, the starch hydrolysate may be concentrated to yield a syrup having a solids content greater than 50 percent. Generally, industry prefers use of a syrup of higher solids content both because it is advantageous in shipping and in applications.

The refining of the hydrolysate is achieved by conventional refining methods. These include treatment with vegetable carbon, ion exchange resins, filtration, centrifugation and the like.

The invention will now be described in further detail by means of several exemplary demonstrations thereof. In each case, the DP distribution is expressed as percent of total carbohydrate. All parts and percentages are by weight unless expressly stated to be otherwise.

EXAMPLE 1

Production of Low D.E. Products from Corn Starch

This example illustrates a preferred procedure for producing low D.E. products from corn starch by the process of this invention.

Unmodified corn starch was slurried in water to provide an aqueous suspension containing 32 percent by weight of the starch. The pH was at 7.5–8.0. To this mixture was added Ht–1,000 bacterial alpha amylase at a concentration of 0.05 percent based on starch solids. This starch suspension was then transferred over a 30 minute period to an agitated tank containing sufficient water so that the final solids content of the starch slurry was reduced to 28 percent. The temperature of the starch slurry was controlled to fall in the range from 90°C to 92°C. Liquefaction was then continued for 60 minutes, at which time the hydrolysate was within the D.E. range of 2 to 5. The liquefied starch was then heated to 150°C and held at that temperature for 8 minutes. The heat treatment destroyed residual enzyme activity. It also resulted in improved filtration rates and decreased yield losses upon filtration.

Further saccharification to the final D.E. was accomplished by the addition of more HT–1,000 bacterial alpha amylase after cooling the liquefied starch hydrolysate to a suitable temperature for conversion. Thus, the liquefied starch was cooled to 80–85°C and HT-1,000 enzyme preparation added in an amount of 0.02 percent by weight starch solids. After more than 14 hours of conversion, the desired terminal D.E. of 20 was obtained.

The final starch hydrolysate product was analyzed and the following analytical values were obtained.

Table I

| D.E. | $DP_1$ | $DP_2$ | $DP_3$ | $DP_4$ | $DP_5$ | $DP_6$ | $DP_{7+}$ | Descriptive Ratio |
|---|---|---|---|---|---|---|---|---|
| 20.7 | 2.4 | 7.5 | 10.8 | 8.0 | 6.9 | 15.1 | 49.4 | 2.4 |

It may be seen from the above that the product resulting from Example 1 possesses a descriptive ratio of about 2.4.

EXAMPLE 2

Production of Low D.E. Products from Several Starches Other Than Corn

This example illustrates the production of low D.E. products from many different starches in accordance with the present invention.

To each of several different slurries of the starches listed in Table 2 below, respectively, each containing 30 percent by weight starch, at pH 7.2, a dosage of HT-1,000 bacterial alpha amylase was added in an amount of 0.025 percent on a starch solids basis. Each of the starch suspensions was liquefied as described in Example 1 and then heated to 120°C for 15 minutes. After cooling to 60°C and readjusting the pH to about 7.2, an additional dosage of the HT-1,000 enzyme preparation was added to each of the several portions of the respective liquefied staroh hydrolysates to further saccharify the hydrolysates to D.E. values within the range from 5 to 20. The conversions were carried out for approximately 48 hours at 60°C. The dosages of the enzyme preparation employed for saccharification and the D.E. values obtained were as follows.

Table 2

| Starch | HT-1000 Enzyme Preparation, Dosage for Saccharification (% starch solids) | |
|---|---|---|
| | 0.001 | 0.002 |
| | D.E. of Product | |
| Potato | 12.3 | 17.4 |
| White sweet potato | 7.4 | — |
| Grain sorghum | 13.0 | 17.4 |
| Tapioca | 13.3 | 17.1 |
| Wheat | 13.3 | 18.5 |
| Rice | 13.0 | 17.0 |
| Sago | 11.8 | 15.5 |
| Arrowroot | 9.5 | — |

Following conversion, the resulting hydrolysates were each adjusted to pH 4.0 and then refined for 30 minutes at 60°C with activated carbon in an amount equivalent to 1 percent of the hydrolysate, dry substance basis. The hydrolysates were then filtered and evaporated to 65 percent solids concentration to yield low D.E. syrups. In addition, some portions of the syrups were evaporated to dryness to yield low D.E. syrup solids. In Table 3 below, analyses of these products, and of typical acid hydrolysates, are reported for comparative purposes.

Table 3

TYPICAL SACCHARIDE ANALYSES

| Hydrolysate Composition, % by weight | D.E. 5 | 10 | 15 | 20 |
|---|---|---|---|---|
| A. Enzyme hydrolysis | | | | |
| $DP_1$ | 0.1 | 0.3 | 0.7 | 1.4 |
| $DP_2$ | 1.3 | 3.4 | 5.5 | 7.6 |
| $DP_3$ | 1.8 | 4.3 | 6.9 | 9.4 |
| $DP_4$ | 1.8 | 3.5 | 5.2 | 6.9 |
| $DP_5$ | 1.8 | 3.6 | 5.5 | 7.4 |
| $DP_6$ | 3.3 | 7.0 | 10.6 | 14.3 |
| $DP_7$ and higher | 89.9 | 77.9 | 65.6 | 53.0 |
| Total $DP_{1-6}$ | 10.1 | 22.1 | 34.4 | 47.0 |
| Descriptive ratio | 2.0 | 2.2 | 2.3 | 2.4 |
| B. Acid hydrolysis (prior art process) | | | | |
| $DP_1$ | — | 2.3 | 3.7 | 5.5 |
| $DP_2$ | — | 2.8 | 4.4 | 5.9 |
| $DP_3$ | — | 2.9 | 4.4 | 5.8 |
| $DP_4$ | — | 3.0 | 4.5 | 5.8 |
| $DP_5$ | — | 3.0 | 4.3 | 5.5 |
| $DP_6$ | — | 2.2 | 3.3 | 4.3 |
| $DP_7$ and higher | — | 83.8 | 75.4 | 67.2 |
| Total $DP_{1-6}$ | — | 16.2 | 24.6 | 32.8 |
| Descriptive ratio | — | 1.6 | 1.6 | 1.6 |

It is readily seen from Table 3 that hydrolysis of starch with a two step enzyme application to a D.E. from 5 to 20 provides a descriptive ratio of at least 2.0, whereas acid hydrolysis fails entirely to produce a hydrolysate having this ratio.

It was observed that the hydrolysates prepared by enzyme hydrolysis of starch exhibited extraordinary clarity and substantially complete lack of opaqueness whereas the acid hydrolysates were decidedly opaque and exhibited little clarity except above a D.E. value of at least 25.

Thus it has been shown that the hydrolysates and syrups of this invention are substantially more water soluble and exhibit improved clarity and lack of opaqueness compared to acid conversion products currently available.

Haze development will vary considerably in prior art low D.E. hydrolysates depending on the temperature at which the hydrolysates are held, the solids concentration, and the degree of hydrolysis are reflected by the D.E. values as well as other factors. In the extreme cases, the hydrolysate can become completely opaque and set up solid such as in paste. In less extreme cases, haze particles may be found to agglomerate and settle toward the bottom of the liquor resembling sludge. In less severe cases, haze particles appear to be too fine and too dispersed to agglomerate to a marked degree. They therefore remain in suspension, imparting a cloudy appearance. In each of these cases, the optical clarity of the liquors is adversely affected.

Haze formation may therefore be conveniently determined by measuring the amount of ligh passing through a sample of the hydrolysate as compared to that passing through a blank of distilled water. This is used as a test for determining the clarity and stability of hydrolysates prepared in accordance with this example.

Hydrolysates made in accordance with the procedure of this example were examined spectrophotometrically by measuring the percent light transmittance at 600 mu through 4 centimeter cells, each containing portions of the hydrolysates respectively which had first been held 3 days at 5°C after being concentrated to 65 percent solids. The relative stability of low D.E. syrups prepared from starch by enzyme hydrolysis in accordance with the invention is indicated by the very high light transmittance values observed which are presented in the following table.

Table 4

% LIGHT TRANSMITTANCE

| D.E. Value | Corn Starch | Waxy Maize Starch | Conventional Acid Hydrolyzed Corn Starch |
|---|---|---|---|
| 10 | — | 97 | 0 |
| 15 | 90 | 98 | 0 |
| 18 | 92 | 98 | 0 |
| 20 | 95 | 99 | 1 |

In contrast, hydrolysates prepared under identical conditions with acid to D.E. of at least 20 or greater either failed to furnish clear, haze-free hydrolysates because they could not be filtered at any appreciable rate of conversion, or after filtration was achieved the clarified hydrolysate soon exhibited haze formation, often becoming completely opaque and exhibiting 0% light transmittance within 3 days at 5°C. For practical purposes, syrups with a clarity greater than 80 percent transmission are desirable for commercial use.

The non-waxy starch hydrolysates of the present invention may be further described by the characterizations of the product by means of iodine absorbancy. The iodine absorbancy value (I.A.V.) is defined as the absorbancy at 500 mu expressed on a 5-cm cell basis and calculated to a concentration of 1-mg of dry substance per ml.

The iodine absorbancy value found for a given starch hydrolysate is indicative of the structure and degree of polymerization of the material in the starch hydrolysate. The higher the absorbancy value, the lower the water solubility of the starch hydrolysate, and the lower the water solubility the greater the probability of haze formation in solution or syrup made from the starch hydrolysate.

One procedure for determining the iodine absorbancy value for a starch hydrolysate is as follows. An iodine reagent is made up first, by preparing an aqueous iodine stock solution containing 0.200 g of resublimed iodine and 2.000g of reagent grade potassium iodine per 100 ml. Next, an aqueous stock solution is prepared of the sample at the concentration shown below:

| Sample D.E. | Stock Solution (For Regular Starch Based Products) g.d.s. | Volume, ml | Sample Concentration mg d.s./ml |
|---|---|---|---|
| 5 | 2 | 1000 | 0.04 |
| 10 | 2 | 200 | 0.20 |
| 15 | 6 | 100 | 1.20 |
| 19 | 12 | 100 | 2.40 |

The term "regular starch" is employed to distinguish from waxy starch, for which a different procedure is advisable.

The recommended concentration is dependent on the D.E. value of the sample. The sample is weighed to the nearest mg. Then, a 10-ml aliquot of the stock solution is transferred into a 500-ml volumetric flask, to which about 450 ml of distilled water is added and mixed. Then 5 ml of the iodine reagent is added, and the contents of the flask are then diluted to the 500 ml mark with distilled water. An iodine reagent blank is also prepared in an identical manner, as a control. The sample and blank are placed in a 25.0 + 0.05°C constant temperature water bath for about 30 minutes. They are then removed and the absorbancy value of the sample is determined at once against the blank, at 500 mu in a Beckman —B spectrophotometer, using a 4-cm cell. To correct a 5-cm cell basis, the observed value is multiplied by 1.25.

EXAMPLE 3

Determination of Iodine Absorbancy Values

Low D.E. products were prepared from corn starch under the same conditions as in Example 1, at several different D.E. values, as identified in Table 5 below. Iodine absorbancy values (I.A.V.) were then determined for samples of each of the products, as follows:

Table 5

| Product D.E. | Iodine Absorbancy Value |
|---|---|
| 5.5 | 15.0 |
| 12.3 | 2.5 |
| 16.0 | 0.54 |
| 19.0 | 0.11 |

Observations have confirmed the direct relationship between the value of the iodine absorbancy value and the relative insolubility of the products in water, and, as well, the corrollary that the lower the iodine absorbancy value, the greater the stability of the low D.E. product, in solution or syrup, against haze formation.

The relationship of the iodine absorbancy value and the D.E. of any non-waxy starch hydrolyzate may be expressed approximately by the following equations, where "A" is the iodine absorbancy value and a. Where the D.E. is from 5 – 10: log A = −0.0905 D.E. + 1.683, and
b. Where the D.E. is from 10 – 20: log A = −0.1830 D.E. + 2.606

These equations have been found to conform to observed actual values to within about 20 percent. They are therefore just approximations, but they are valuable tools for use in predicting product properties.

Measurement of the iodine absorbancy value of a given low D.E. product offers a quick way to determine whether the product offers the advantages of the present invention, without the need for undertaking time-consuming haze stability tests. Thus, if the observed or actual value for "A" exceeds the value of "A" that can be calculated from the appropriate equation above by more than about 25 percent, then the product probably will not offer advantages over prior art products. On the other hand, if the actual value of "A" is less than the calculated figure, then the product can be expected to be highly satisfactory.

General

The hydrolysate product of the present invention may be concentrated to produce syrups or syrup solids. The syrup solids are obtained by reducing the moisture content of the syrup to less than 15%, preferably about 4%. The syrup solids exhibit excellent water solubility and are substantially free of haze when placed in solution.

The descriptive ratio [$DP_{1-6}$/D.E.] is a convenient method for determining the characteristics of the hydrolysate or syrup. If the descriptive ratio is at least about 2, the product is highly water soluble and usually exhibits almost no haze formation. If the descriptive ratio is substantially below 2, e.g. 1.6 or less, for example, the product exhibits haze formation and is less water soluble than products with a descriptive ratio of at least 2.

The hydrolysates of this invention, whether in the form of dilute or concentrated syrups, or in the form of dry solids, are characterized by blandness of taste and low sweetness, and they are non-hygroscopic. They are fully and readily soluble in water. When used in food products, they have a minimal effect upon flavor, while providing bulk, stability, and lack of hygroscopicity.

These characteristics make the products of the invention particularly suitable for applications such as, for example, carriers for synthetic sweeteners, flavors, coloring agents and essences; spray drying adjuncts for coffee extracts and tea extracts; bulking, bodying, and dispersing agents in synthetic creams or coffee whiteners; ingredients promoting moisture retention is bread, pastry, and meats; and as components of dry soup mixes, bakery mixes, frosting mixes, spice mixes and blends, beverage powders, condiments, gravy mixes, sauce mixes, and frozen dairy foods. In addition, they are useful in the formulation of anti-caking agents, tabletting compounds, whipped products, protective coatings agglomeration aids, and low calorie or reduced in calorie foods and beverages.

When the starch hydrolysate products of the invention are used as solutions, at a solids concentration of less than about 40 percent by weight, they are particularly attractive because of their bland flavor, low hygroscopicity, low sweetness, and ready solubility. They impart density and good mouthing characteristics without appreciably affecting viscosity or flavor. At solids concentrations above about 40 percent, the solutions contribute significantly to the viscosity characteristics of any system in which they are employed.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

What is claimed is:

1. A process for producing a non-waxy starch hydrolysate which comprises treating an aqueous slurry of a non-waxy cereal starch with bacterial alpha-amylase at a temperature below 95°C to liquefy the starch and to provide a starch hydrolysate having a D.E. within the range of about from 2 to about 15, heating the liquefied starch hydrolysate to a temperature of at least about 95°C and treating the liquefied starch hydrolysate with bacterial alpha-amylase at a temperature below 85°C to produce a starch hydrolysate having a D.E. within the range of about 5 to about 20.

2. A process in accordance with claim 1, wherein the liquefied non-waxy cereal starch has a D.E. in the range of from 2 to about 5.

3. A process in accordance with claim 1, wherein the cereal starch is a non-waxy corn starch.

4. A process in accordance with claim 1 wherein the slurry has a solids content within the range of about 20 to about 40 percent by weight.

5. A process in accordance with claim 1 wherein the cereal starch is liquefied at a temperature between about 70°C to about 95°C.

6. A process in accordance with claim 1 wherein the liquefied starch is heated to a temperature within the range of about 110°C to about 180°C.

7. A process in accordance with claim 1 wherein the D.E. of the non-waxy cereal starch hydrolysate is between about 10 and about 20.

8. A process in accordance with claim 1 which includes a step of concentrating the non-waxy cereal starch hydrolysate thus obtained to produce a syrup having a solids content greater than about 50 percent.

9. A process in accordance with claim 1 which includes the step of concentrating the non-waxy cereal starcy hydrolysate thus obtained to produce a product having a moisture content of less than 15 percent, by weight.

10. A process for producing a non-waxy cereal starch hydrolysate which comprises gelatinizing a non-waxy cereal starch by heating a slurry of the non-waxy starch to a temperature above the gelatinization temperature of the starch, treating the gelatinized starch with bacterial alpha-amylase at a temperature below 95°C to liquefy the starch and to provide a starch hydrolysate having a D.E. within the range of about 2 to about 15, heating the liquefied starch hydrolysate to a temperature of at least about 95°C and treating the liquefied starch hydrolysate with bacterial alpha-amylase at a temperature below 85°C to produce a hydrolysate having a D.E. within the range of about 5 to about 20.

11. A process in accordance with claim 10 wherein the liquefied non-waxy cereal starch has a D.E. in the range of from about 2 to about 5.

12. A process in accordance with claim 10 wherein the starch is a non-waxy corn starch.

13. A process in accordance with claim 10 wherein the slurry has a solids content within the range of about 20 to about 40 percent by weight.

14. A process in accordance with claim 10 wherein the starch is liquefied at a temperature between about 70°C to about 95°C.

15. A process in accordance with claim 10 wherein the liquefied hydrolysate is heated to a temperature within the range of about 110°C to about 180°C.

16. A process in accordance with claim 10 which includes the step of concentrating the hydrolysate thus obtained to produce a syrup having a solids content greater than about 50 percent.

17. A process in accordance with claim 10 which includes the step of concentrating the hydrolysate obtained to produce a product having a moisture content of less than 15 percent, by weight.

* * * * *